United States Patent
Hirao et al.

(10) Patent No.: US 11,299,398 B2
(45) Date of Patent: Apr. 12, 2022

(54) MODIFIED CALCIUM ALUMINATE COMPOUND AND PRODUCTION METHOD THEREFOR

(71) Applicants: Kyoto University, Kyoto (JP); Hitachi Zosen Corporation, Osaka (JP)

(72) Inventors: Kazuyuki Hirao, Kyoto (JP); Heidy Visbal, Kyoto (JP); Minami Hirano, Kyoto (JP); Susumu Hikazudani, Osaka (JP); Satoshi Yoshida, Osaka (JP); Emi Shono, Osaka (JP)

(73) Assignee: NEW-TECH INC., Kyoto (JP)

( * ) Notice: Subject to any disclaimer, the term of this patent is extended or adjusted under 35 U.S.C. 154(b) by 911 days.

(21) Appl. No.: 16/076,125

(22) PCT Filed: Feb. 13, 2017

(86) PCT No.: PCT/JP2017/005033
§ 371 (c)(1),
(2) Date: Aug. 7, 2018

(87) PCT Pub. No.: WO2017/141842
PCT Pub. Date: Aug. 24, 2017

(65) Prior Publication Data
US 2021/0188653 A1    Jun. 24, 2021

(30) Foreign Application Priority Data
Feb. 15, 2016    (JP) .............................. JP2016-025794

(51) Int. Cl.
C01F 7/00        (2006.01)
C01F 7/164       (2022.01)
C01F 1/00        (2006.01)

(52) U.S. Cl.
CPC ............... *C01F 7/164* (2013.01); *C01F 1/00* (2013.01); *C01P 2002/30* (2013.01); *C01P 2004/61* (2013.01)

(58) Field of Classification Search
CPC ........ C01F 7/164; C01F 1/00; C01P 2002/30; C01P 2004/61
USPC ....................................................... 423/115
See application file for complete search history.

(56) References Cited

U.S. PATENT DOCUMENTS

| 2007/0287773 A1* | 12/2007 | Ramdatt ............. C08K 9/06 523/212 |
| 2015/0050209 A1 | 2/2015 | Hikazudani et al. |
| 2015/0336075 A1 | 11/2015 | Hikazudani et al. |

FOREIGN PATENT DOCUMENTS

| EP | 3115339 A1 | 1/2017 |
| JP | 2005-067915 A | 3/2005 |
| JP | 2008-195583 A | 8/2008 |
| JP | 2013-203588 A | 10/2013 |
| JP | 2014-136661 A | 7/2014 |
| JP | 2016-204232 A | 12/2016 |
| WO | 2015/133240 A1 | 9/2015 |
| WO | WO 2016/208563 | * 12/2016 |

OTHER PUBLICATIONS

Jiang Li et al., "Mechanistic Features for Hydroxyl Anion Emission from the Modified 12CaO—7Al2O3 Surface," J. Phys. Chem. B, Jul. 9, 2005, vol. 109, p. 14599-14603.
Katsuro Hayashi et al., "Thermodynamics and Kinetics of Hydroxide Ion Formation in 12CaO—7Al2O3," J Phys Chem. B, May 26, 2005, vol. 109, p. 11900-11906.
International Search Report dated Mar. 14, 2017, issued for PCT/JP2017/005033.
H. Visbal et al., "Nanostructure and surface activation of mayenite (12CaO 7Al2O3) ceramics via femtosecond laser irradiation in solvents", Optics and Laser Technology, vol. 92, Jan. 29, 2017, pp. 126-132 (cited in the Aug. 29, 2019 Search Report for EP17753099.5).
F. Hayashi et al., "NH2-Dianion Entrapped in a Nanoporous 12CaO 7Al2O3 Crystal by Ammonothermal Treatment Reaction Pathways, Dynamics, and Chemical Stability", Journal of the American Chemical Society, vol. 136, No. 33, Jul. 30, 2014, pp. 11698-11706. (cited in the Aug. 29, 2019 Search Report for EP17753099.5).
H. Boysen et al., "Disorder and Diffusion in Mayenite", Acta Physica Polonica A, vol. 117, No. 1, Jan. 1, 2010, pp. 38-41. (cited in the Aug. 29, 2019 Search Report for EP17753099.5).
Official communication dated Aug. 29, 2019, including the extended European Search Report and Written Opinion Issued for the corresponding EP patent application 17753099.5.

* cited by examiner

*Primary Examiner* — Steven J Bos
(74) *Attorney, Agent, or Firm* — Locke Lord LLP; James E. Armstrong, IV; Nicholas J. DiCeglie, Jr.

(57) ABSTRACT

The present invention provides a novel method for producing a calcium aluminate compound having a modified surface. The present invention provides: a method for producing a modified calcium aluminate compound characterized by irradiating a calcium aluminate compound dispersed in an organic dispersion medium with a femtosecond laser, thereby modifying the surface of the calcium aluminate compound; and a modified calcium aluminate compound characterized by being obtained by this method and having at least one of an OH group, a CO group, a CH group, and an NH group.

20 Claims, 6 Drawing Sheets

ETHYLENE GLYCOL

N-METHYLFORMAMIDE

UNIRRADIATED

PEAKS IN GAS CHROMATOGRAPHY ANALYSIS

— WITH FEMTOSECOND LASER IRRADIATION
100%$H_2$ TREATMENT
$H_2$ : 42838
$O_2$ : 64617
$N_2$ : 197070
HYDROGEN AMOUNT : 6.50mL/g

— WITH FEMTOSECOND LASER IRRADIATION
5%$H_2$+95%Ar TREATMENT
$H_2$ : 177
$O_2$ : 64608
$N_2$ : 197031
HYDROGEN AMOUNT : 0.03mL/g

— WITHOUT FEMTOSECOND LASER IRRADIATION
100% $H_2$ TREATMENT
$H_2$ : 15061
$O_2$ : 66373
$N_2$ : 202644
HYDROGEN AMOUNT : 2.30mL/g

MODIFIED CALCIUM ALUMINATE COMPOUND AND PRODUCTION METHOD THEREFOR

TECHNICAL FIELD

The present invention relates to a method for producing a modified calcium aluminate compound, in which the surface of a calcium aluminate compound is modified using a femtosecond laser. In particular, mayenite (one form of the calcium aluminate compound) having a modified surface is favorably used as a ceramic having a large specific surface area in the technical fields of fuel cell materials, hydrogen storage container materials, sensors, electronic devices, ion emitters, hydrogen occlusion materials, catalysts, etc.

BACKGROUND ART

A calcium aluminate compound includes compounds constituted by CaO and $Al_2O_3$ such as $12CaO.7Al_2O_3$, $CaO.Al_2O_3$, $3CaO.Al_2O_3$, and $CaO.2Al_2O_3$, and in addition thereto, compounds obtained by substituting some Ca atoms and/or Al atoms of a crystal skeleton with Si, Na, Sr, Fe, or the like are also treated as calcium aluminate compounds in a broad sense.

For example, mayenite which is one form of the calcium aluminate compound is a compound derived from a cement mineral produced in the Mayen district in Germany and is an oxide ion clathrate aluminosilicate having a representative crystal skeleton of $12CaO.7Al_2O_3$ (hereinafter sometimes denoted as "C12A7").

With respect to mayenite, PTL 1 describes that hydrogen-substituted mayenite $(Ca_{24}Al_{28}O_{64}{}^{4+}.4H^-)$ obtained by substituting free oxygen of mayenite $(Ca_{24}Al_{28}O_{64}{}^{4+}.2O^{2-})$ with hydrogen is used for producing hydrogen, and also describes that conductive mayenite $(Ca_{24}Al_{28}O_{64}{}^{4+}.4e^-)$ is produced by irradiating the hydrogen-substituted mayenite $(Ca_{24}Al_{28}O_{64}{}^{4+}.4H^-)$ with ultraviolet light.

Further, PTL 2 discloses a method for producing hydrogen occlusion mayenite $(Ca_{24}Al_{28}O_{66})$ by contacting hydrogen gas with mayenite $(Ca_{24}Al_{28}O_{66})$ at normal pressure and high temperature, for example, 1300° C., followed by natural cooling to normal temperature.

CITATION LIST

Patent Literature

PTL 1: JP-A-2014-136661
PTL 2: JP-A-2016-204232

SUMMARY OF INVENTION

Technical Problem

However, these patent documents do not describe a method for modifying the surface of mayenite, much less describe a method for controlling the particle diameter of mayenite.

Solution to Problem

The present invention has been completed as a result of intensive studies for solving the above problem, and includes the following aspects (1) to (9).

(1) A modified calcium aluminate compound, characterized by having at least one of an OH group, a CO group, a CH group, and an NH group.

(2) The modified calcium aluminate compound according to the above (2), characterized by having an average particle diameter of 7 μm or less.

(3) The modified calcium aluminate compound according to the above (1) or (2), characterized by having a median diameter (D50) of 60 μm or less.

(4) A method for producing a modified calcium aluminate compound, which is a method for producing the modified calcium aluminate compound according to any one of the above (1) to (3), characterized by irradiating a calcium aluminate compound dispersed in a dispersion medium with a femtosecond laser, thereby modifying the surface of the calcium aluminate compound.

(5) The method for producing a modified calcium aluminate compound according to the above (4), characterized in that the dispersion medium is an alcohol, an ether, a saccharide, a hydrocarbon, a nitrogen-containing organic compound, a halogen-containing organic compound, a boron-containing organic compound, or a sulfur-containing organic compound.

(6) A method for producing a modified calcium aluminate compound, which is a method for producing the modified calcium aluminate compound according to any one of the above (1) to (3), characterized by irradiating a calcium aluminate compound in a particulate form dispersed in an alcohol with a femtosecond laser, thereby atomizing the calcium aluminate compound in a particulate form.

(7) A method for producing a modified calcium aluminate compound, which is a method for producing the modified calcium aluminate compound according to any one of the above (1) to (3), characterized by dispersing a calcium aluminate compound in a particulate form in each of alcohols having different polarities and irradiating the compound with a femtosecond laser, thereby controlling the particle diameter of the calcium aluminate compound in a particulate form.

(8) The method for producing a modified calcium aluminate compound according to any one of the above (4) to (7), characterized in that the pulse width of the femtosecond laser is $10^{-15}$ s or more and $10^{-12}$ s or less.

(9) The method for producing a modified calcium aluminate compound according to any one of the above (4) to (8), characterized in that the calcium aluminate compound is a compound having a representative composition composed of $(Ca_{12}Al_{14}O_{33})$ and having a crystalline structure constituted by three-dimensionally connected voids (cages) or katoite $[Ca_3Al_2(OH)_{12}]$.

Advantageous Effects of Invention

The method for producing a modified calcium aluminate compound according to the invention is a method for producing a surface-modified calcium aluminate compound by irradiating a calcium aluminate compound dispersed in an organic dispersion medium with a femtosecond laser, and provides a novel method for producing a modified calcium aluminate compound which is conventionally not known at all.

In addition, by using an alcohol as the dispersion medium, and irradiating a calcium aluminate compound in a particulate form dispersed therein with a femtosecond laser, the calcium aluminate compound in a particulate form is atomized to increase the specific surface area, so that the hydrogen occlusion amount can be increased.

Further, in the method in which an alcohol is used as the dispersion medium, and a calcium aluminate compound in a particulate form dispersed therein is irradiated with a femtosecond laser, by using alcohols having different polarities, the particle diameter of the calcium aluminate compound in a particulate form can be controlled.

BRIEF DESCRIPTION OF DRAWINGS

FIG. 2-2 is a spectrum showing the results of a spectral analysis by diffuse reflection IR spectroscopy (DRIFT method).

DESCRIPTION OF EMBODIMENTS

Figure 1:
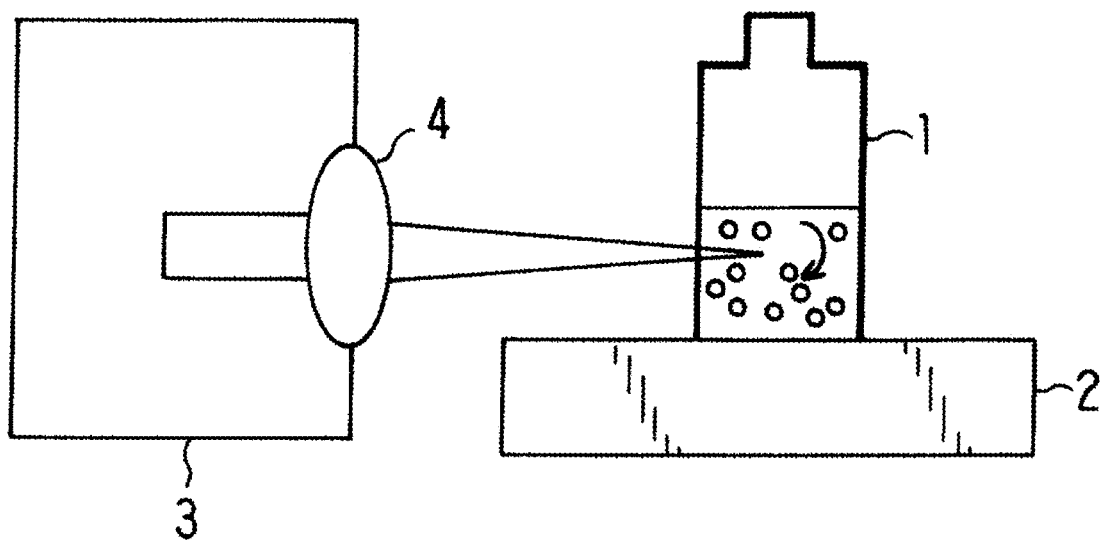
FIG. 1 is a vertical cross-sectional view schematically showing a state of femtosecond laser irradiation.

The present invention provides a method for producing a calcium aluminate compound, characterized by irradiating a calcium aluminate compound dispersed in a dispersion medium with a femtosecond laser, thereby modifying the surface of the calcium aluminate compound.

In the method for producing a modified calcium aluminate compound according to the present invention, a calcium aluminate compound to be used as a raw material may be a compound obtained by substituting some Ca atoms and/or Al atoms of a crystal skeleton with Si, F, Na, Sr, Fe, or the like, other than a compound composed of CaO and $Al_2O_3$ as chemical components. Preferably, the compound is a mayenite type compound which is one form of the calcium aluminate compound or katoite [$Ca_3Al_2(OH)_{12}$]. The mayenite type compound may be an oxide ion clathrate aluminosilicate, and is preferably a compound in which the molar ratio of calcium to aluminum is within a range of 13:12 to 11:16.

The mayenite type compound (C12A7) may be a compound obtained by substituting some Ca atoms and/or Al atoms of a crystal skeleton with another atom within a range where a cage structure formed by a crystal lattice skeleton is maintained or may be an isomorphic compound obtained by substituting some or all free oxygen ions in the cage structure with another anion. The mayenite type compound (C12A7) is sometimes denoted as $Ca_{12}Al_{14}O_{33}$ or $Ca_{24}Al_{28}O_{66}$.

The mayenite type compound (C12A7) is preferably a compound having a representative composition composed of ($Ca_{12}Al_{14}O_{33}$) and having a crystalline structure constituted by three-dimensionally connected voids (cages).

The dispersion medium to be used in the method for producing a modified calcium aluminate compound according to the present invention is not particularly limited as long as it does not destroy the structure of the calcium aluminate compound. For example, an alcohol having an OH group, an ether, a saccharide, a hydrocarbon having a CH group (C—H bond), a nitrogen-containing organic compound having a CN group, a halogen-containing organic compound, a boron-containing organic compound, or a sulfur-containing organic compound is used. Specific examples of the dispersion medium include 1-butanol, 2-propanol, ethanol, ethylene glycol, hexane, N-methylformamide, $C_2HF_3O_2$, trifluoroethanol ($CF_3CH_2OH$), hydrofluoroethers (HFE), tetrahydrofuran (THF), and dimethyl sulfoxide (DMSO). Among these dispersion media, alcohols and ethers, particularly alcohols are preferred.

The concentration of the mayenite type compound (C12A7) in the dispersion medium is preferably from $0.05 \times 10^{-4}$ g/L to $20 \times 10^{-5}$ g/L, more preferably from $0.08 \times 10^{-4}$ g/L to $15 \times 10^{-5}$ g/L.

The femtosecond laser to be used in the method for producing a modified calcium aluminate compound according to the present invention is an ultrashort pulse laser beam such that a pulse laser beam has a pulse width of 1 femtosecond (fs) or more and less than 1 picosecond (ps). By adjusting the duty (%) with respect to one pulse time, the pulse width of the pulse laser beam can be controlled within a range of 1 femtosecond (fs) or more and less than 1 picosecond (ps). The pulse width is preferably $10^{-15}$ s or more and $10^{-12}$ s or less, more preferably 185 fs or more and 210 fs or less. The wavelength of the pulse laser beam is a wavelength including ultraviolet light, visible light, and near infrared light, and is set, for example, within a range of 1400 nm to 200 nm, and is set preferably within a range of 1000 to 250 nm, most preferably 900 to 450 nm. The repetition frequency is adjusted to preferably 10 to 500 kHz, the average output power of the laser is adjusted to preferably 5 to 0.1 W, more preferably 2 to 0.2 W. The numerical aperture (NA) of an objective lens is preferably from 0.1 to 2, more preferably from 0.3 to 1.

In the method for producing a modified calcium aluminate compound according to the present invention, for the femtosecond laser irradiation, for example, as shown in FIG. 1, a method in which an airtight container (1) housing a dispersion liquid of a calcium aluminate compound dispersed in an organic dispersion medium is disposed on a magnetic stirrer (2), and the dispersion liquid in the airtight container (1) is irradiated with a femtosecond laser through an objective lens (4) from a laser transmitter (3) under stirring may be adopted. The airtight container (1) is preferably a container which transmits a laser, for example, a quartz cell.

The irradiation conditions of a femtosecond laser may be as follows: time: about 10 min to 20 min, temperature: normal temperature, pressure: normal pressure, and atmosphere in container: air, however, these may be changed as appropriate.

In a preferred embodiment of the present invention, a calcium aluminate compound in a particulate form dispersed in an alcohol is irradiated with a femtosecond laser, whereby the calcium aluminate compound in a particulate form is atomized. By decreasing the particle diameter through the femtosecond laser irradiation so as to increase the specific surface area in this manner, the obtained modified calcium aluminate compound, for example, modified mayenite can be used as a hydrogen occlusion material, and the hydrogen occlusion amount can be improved as compared with conventional mayenite.

In another preferred embodiment of the present invention, a calcium aluminate compound in a particulate form is irradiated with a femtosecond laser in each of dispersion media in which the polarity of an alcohol is changed, whereby the particle diameter of the calcium aluminate compound in a particulate form is controlled.

That is, in the method in which an alcohol is used as the dispersion medium and a calcium aluminate compound in a particulate form dispersed therein is irradiated with a femtosecond laser, whereby the calcium aluminate compound in a particulate form is atomized, the particle diameter of the modified calcium aluminate compound to be obtained can be controlled using each of a plurality of alcohols having different polarities as the dispersion medium. One index of the polarity is a relative permittivity (the ratio ($\varepsilon/\varepsilon_0$) of the permittivity of the medium (E) to the permittivity of vacuum ($\varepsilon_0$)).

The modification mechanism of the surface of the calcium aluminate compound by femtosecond laser irradiation is considered as follows.

By irradiating the calcium aluminate compound dispersed in the dispersion medium with a femtosecond laser, a functional group of the dispersion medium is cleaved and imparted to the surface of the calcium aluminate compound, whereby the surface is modified.

Further, in the method in which an alcohol is used as the dispersion medium, and the calcium aluminate compound in a particulate form dispersed therein is irradiated with a femtosecond laser, by using an alcohol having a higher relative permittivity (that is, having a higher polarity), more OH groups are attached to the calcium aluminate compound, and repulsion between pulverized particles becomes larger, and the particle diameter is kept small. Due to this phenomenon, by using alcohols having different polarities, the particle diameter of the calcium aluminate compound in a particulate form can be controlled.

EXAMPLES

Next, Examples of the present invention will be described along with Comparative Examples, however, the present invention is not limited to these Examples.

In this Example, a method for producing a mayenite type compound (C12A7) which is one form of the calcium aluminate compound is not particularly limited. For example, in this Example, a mayenite type compound was produced by adding aluminum oxide to calcium oxide as described below.

In addition thereto, the compound can also be produced by a production step including a step of producing katoite using an aluminum powder and calcium hydroxide as raw materials and a step of converting the katoite into a mayenite type compound.

A mayenite type compound used in Examples and Comparative Examples was prepared by the following method.

A powder of $CaCO_3$ (Kishida Chemical Co., Ltd., 99.5%) (4.00 g) and a powder of $\gamma$-$Al_2O_3$ (Alfa Aesar, 99.9%) (2.38 g) were weighed separately by an electronic balance and mixed well using a mortar. The mixed powder was transferred to an alumina crucible, and melted at 1300° C. for 12 hours in an air atmosphere using an electric furnace (Koyo Thermo Systems Co., Ltd., KBF314N), followed by natural cooling, whereby a mayenite type compound (C12A7) was produced (hereinafter, the mayenite type compound is referred to as "mayenite").

Example 1

The mayenite (0.10 g) was weighed by an electronic balance and transferred to a beaker. As the dispersion medium, 1-butanol (purity: 99.9, Wako Pure Chemical Industries, Ltd.) (1 mL) was added thereto, and thereafter, the entire mixture was stirred for 3 minutes using an ultrasonic stirrer ("W-113", manufactured by Honda Electronics Co., Ltd.). The obtained dispersion liquid was transferred to a quartz cell with a screw cap for spectroscopy, and the dispersion medium was added to the cell so that the total amount was 1.5 mL. In the quartz cell, a rotator of a magnetic stirrer was placed, and while stirring the dispersion liquid by the stirrer, a femtosecond laser transmitter ("Ti: Sapphire laser Mira" manufactured by Coherent Inc., repetition frequency: 250 kHz, pulse width: 185 to 210 fs, wavelength: 800 nm) was used, the average output power of the laser was adjusted to 0.4 W, and the dispersion liquid in the quartz cell was irradiated with a femtosecond laser for 10 minutes through the objective lens (manufactured by Nikon Corporation, magnification: 50 times) with a numerical aperture (NA) of 0.6.

After completion of femtosecond laser irradiation, the dispersion liquid was subjected to suction filtration (quantitative filter paper: ASONE, 393), and the residual solid was washed with ethanol. Subsequently, this was completely dried at 60° C. using a dryer ("DKN402", manufactured by Yamato Scientific Co., Ltd.), and the powder was collected.

Example 2

The same procedure as in Example 1 was performed except that the same amount of ethanol (purity: 99.5%, Kishida Chemical Co., Ltd.) was used as the dispersion medium, and a powder product was collected. The obtained atomized mayenite had an average particle diameter of 2.34 μm and a median diameter (D50) of 28.8 μm.

Example 3

The same procedure as in Example 1 was performed except that the same amount of ethylene glycol (purity: 99.5%, Wako Pure Chemical Industries, Ltd.) was used as the dispersion medium, and a powder product was collected. The obtained atomized mayenite had an average particle diameter of 1.2 μm and a median diameter (D50) of 1.45 μm.

Example 4

The same procedure as in Example 1 was performed except that the same amount of hexane (purity: 97.0%, Nacalai Tesque, Inc.) was used as the dispersion medium, and a powder product was collected.

Example 5

The same procedure as in Example 1 was performed except that the same amount of 2-propanol (purity: 99.5%, Nacalai Tesque, Inc.) was used as the dispersion medium, and a powder product was collected. The obtained atomized mayenite had an average particle diameter of 2.40 μm and a median diameter (D50) of 29.0 μm.

Example 6

The same procedure as in Example 1 was performed except that the same amount of acetone (purity: 99.0%, Kishida Chemical Co., Ltd.) was used as the dispersion medium, and a powder product was collected.

Example 7

The same procedure as in Example 1 was performed except that the same amount of N-methylformamide (purity:

99%, Nacalai Tesque, Inc.) was used as the dispersion medium, and a powder product was collected.

Example 8

The same procedure as in Example 1 was performed except that 0.10 g of mayenite used in Example 1 was changed to 0.10 g of katoite, and the same amount of ethylene glycol (purity: ≥99.5%, Wako Pure Chemical Industries, Ltd.) was used as the dispersion medium, and a powder product was collected. The obtained atomized katoite had an average particle diameter of 7.1 μm and a median diameter (D50) of 6.6 μm.

Comparative Example 1

The femtosecond laser-unirradiated mayenite type compound in the step of Example 1 was prepared. The mayenite had an average particle diameter of 7.24 μm and a median diameter (D50) of 61.5 μm.

Comparative Example 2

The femtosecond laser-unirradiated katoite in the step of Example 8 was prepared. The katoite had an average particle diameter of 23.3 μm and a median diameter (D50) of 5.9 μm.
Analysis of Product
(1) Spectral Analysis by Fourier Transform Infrared Spectrophotometer (FT-IR)

With respect to the samples of the products of the above-mentioned Examples 1 to 8 and Comparative Example 1, the functional groups on the surfaces of the samples before and after laser irradiation were evaluated by diffuse reflection IR spectroscopy (DRIFT method) using an FT-IR spectrometer ("Nicolet IS5", manufactured by Thermo Fisher Scientific, Inc.) and a DIGS KBR detector (resolution: 4 cm$^{-1}$, scan number: 256).

Figure 2:
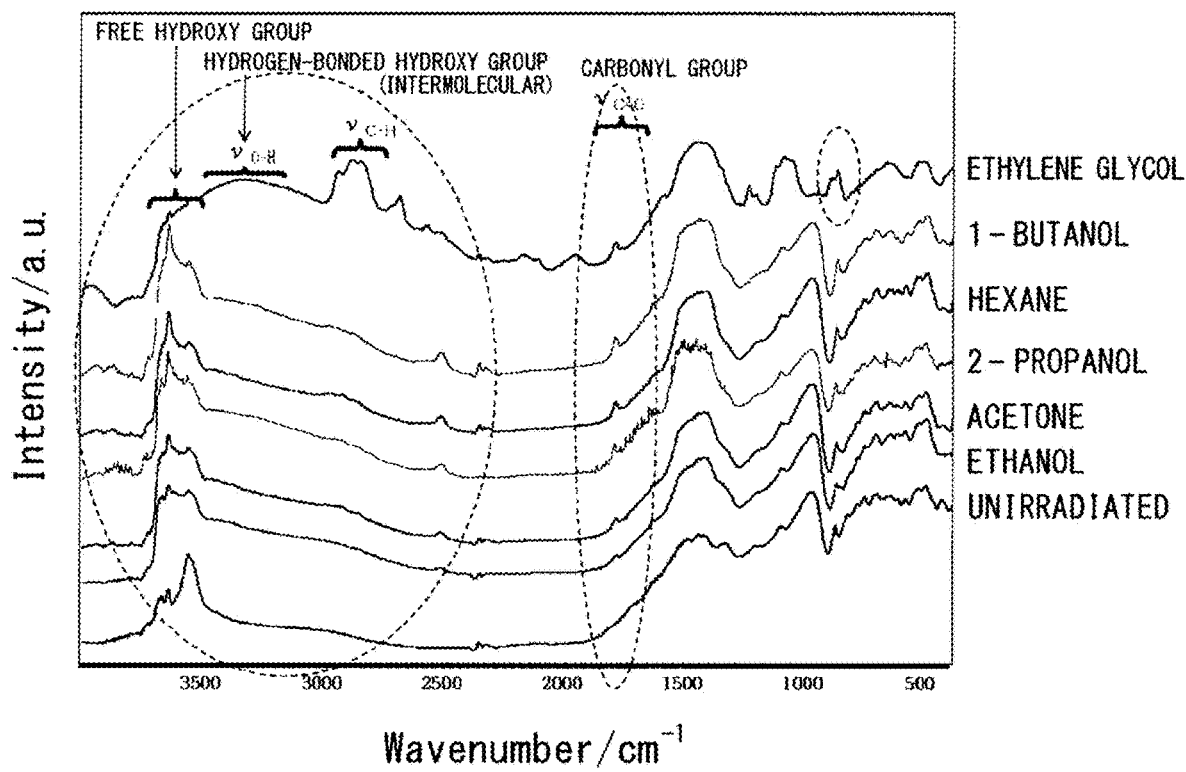
FIG. 2 is a spectrum showing the results of a spectral analysis by diffuse reflection IR spectroscopy (DRIFT method).
Figure 2:
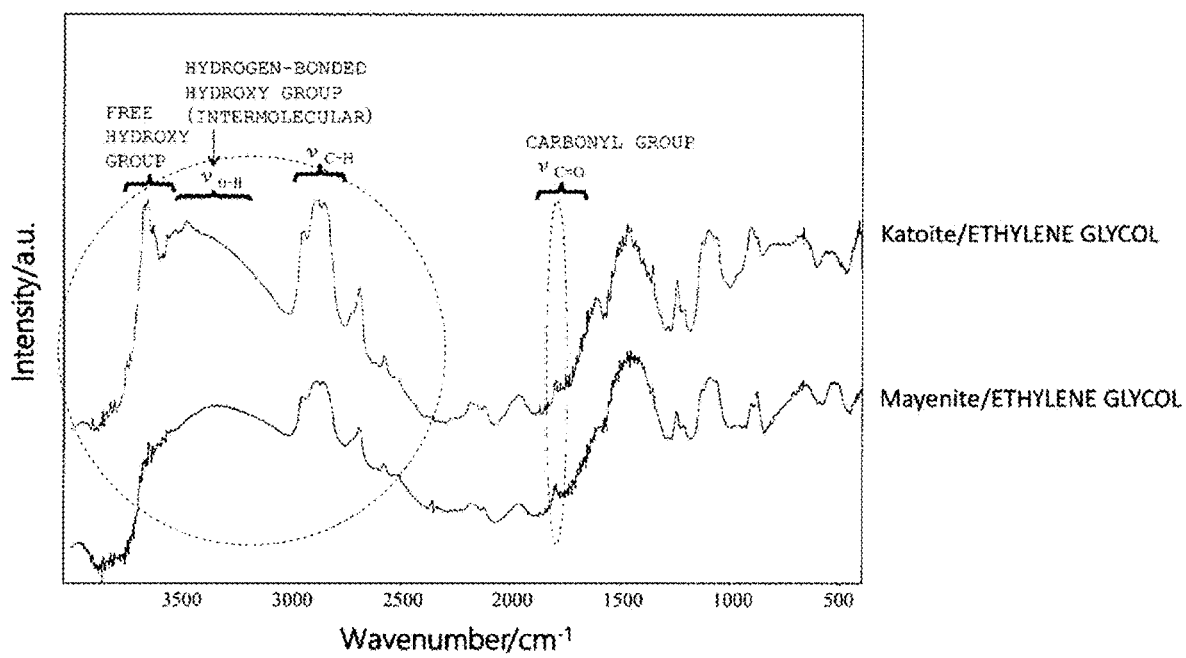
Figure 3:
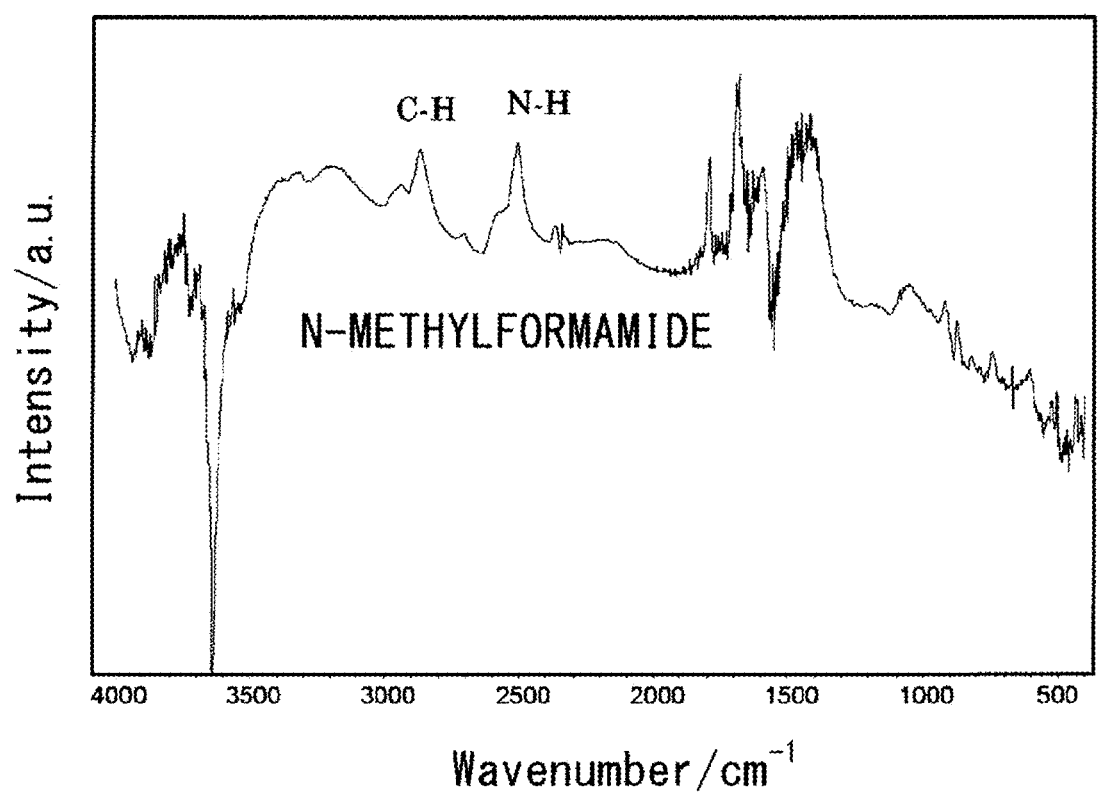
FIG. 3 is a spectrum showing the results of a spectral analysis by diffuse reflection IR spectroscopy (DRIFT method).

The diffuse reflection IR spectrum with respect to each dispersion medium is shown in FIG. 2 (irradiated mayenite products and unirradiated mayenite product), FIG. 2-2 (irradiated mayenite product and irradiated katoite product), and FIG. 3 (irradiated mayenite product).

Figure 4:
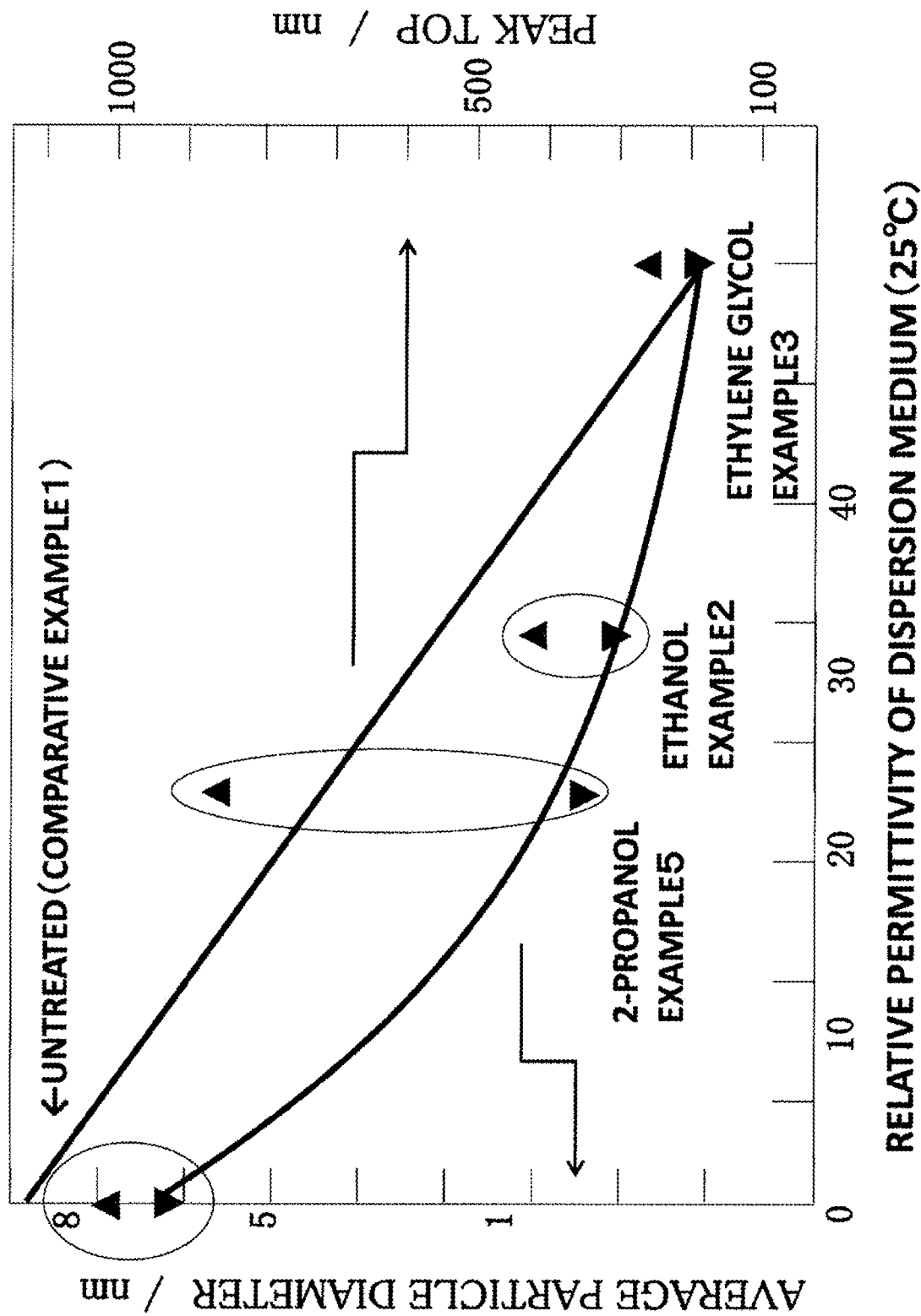
FIG. 4 is a graph showing a relationship between the relative permittivity of a dispersion medium and the average particle diameter.

From the diffuse reflection IR spectra, it is found that by irradiating the calcium aluminate compound dispersed in the dispersion medium with a femtosecond laser, the functional group of the dispersion medium is cleaved and imparted to the surface of the calcium aluminate compound.
(2) Measurement of Particle Size Distribution With respect to the samples of the products of Examples 2, 3, 5, and 8 and Comparative Examples 1 and 2, by using a zeta potential and particle size measurement system high-sensitive system (ELSZ-2Plus, manufactured by Otsuka Electronics Co., Ltd.), the particle size distribution was measured within the nanometric range from the dynamic light scattering method on Brownian motion. Each sample was dispersed in ethanol at about 1%. A relationship between the average particle diameters obtained from the samples of the products of Examples 2, 3, and 5, and Comparative Example 1 and the relative permittivity of the dispersion media is shown in the graph of FIG. 4. In the drawing, as the average particle diameter, the median diameter (D50) is shown, and as the peak top, the mode diameter is shown.

From FIG. 4, it is found that by using an alcohol-based dispersion medium having a higher relative permittivity (that is, having a higher polarity) among the alcohol-based dispersion media, the average particle diameter becomes smaller. This is considered to be because by using an alcohol-based dispersion medium having a higher relative permittivity, more OH groups are attached to the surface of the calcium aluminate compound, and repulsion between pulverized particles becomes larger, and the particle diameter can be kept small. Therefore, the modified calcium aluminate compound having an OH group has an average particle diameter of 7 μm or less.

The relative permittivity of the dispersion medium N-methylformamide used in Example 7 is 182, and in the product obtained in the Example, an OH group is not present on the surface of the mayenite, and therefore, after atomization, the particle diameter could not be maintained and particles considered to be reaggregated were confirmed.
(3) Observation by Field Emission-Type Scanning Electron Microscope (FE-SEM)

Figure 5:
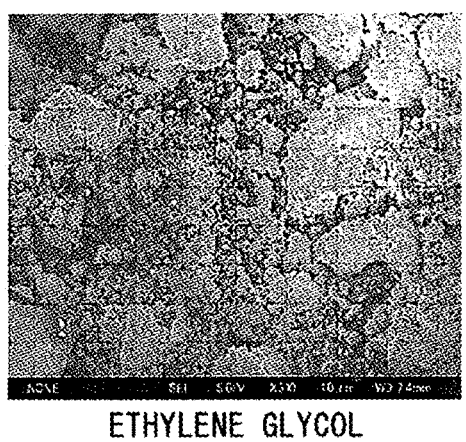
FIG. 5 shows SEM images of the surfaces of the respective products of Example 3, Example 6, and Comparative Example 1.
Figure 5:
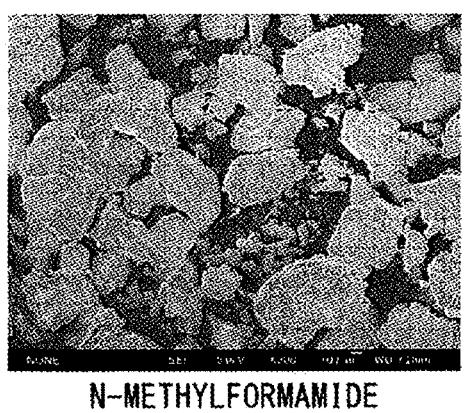
Figure 5:
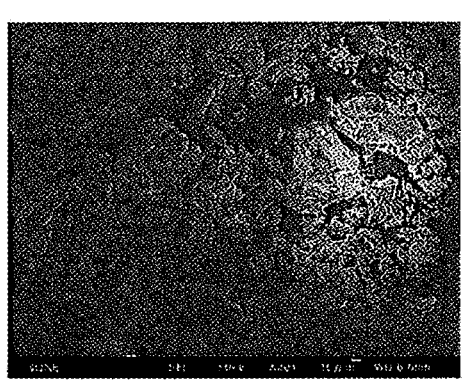

With respect to the samples of the products of Examples 3 and 7 and Comparative Example 1, by using a field emission-type scanning electron microscope ("JSM-6705F", manufactured by JEOL Ltd.), a secondary electron image was observed at an acceleration voltage of 5 kV. The obtained SEM images are shown in FIG. 5.

Figure 6:
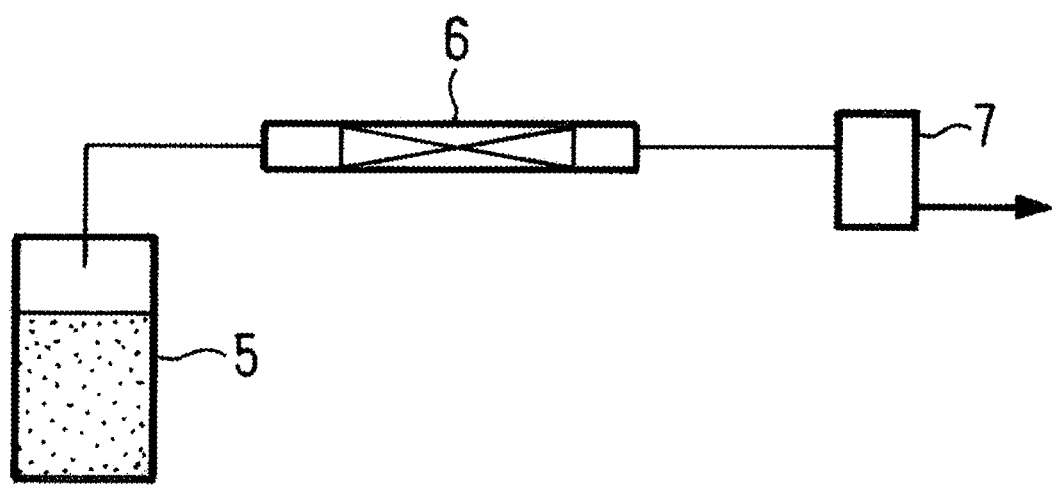
FIG. 6 is a vertical cross-sectional view schematically showing a hydrogen occlusion testing device.
Figure 7:
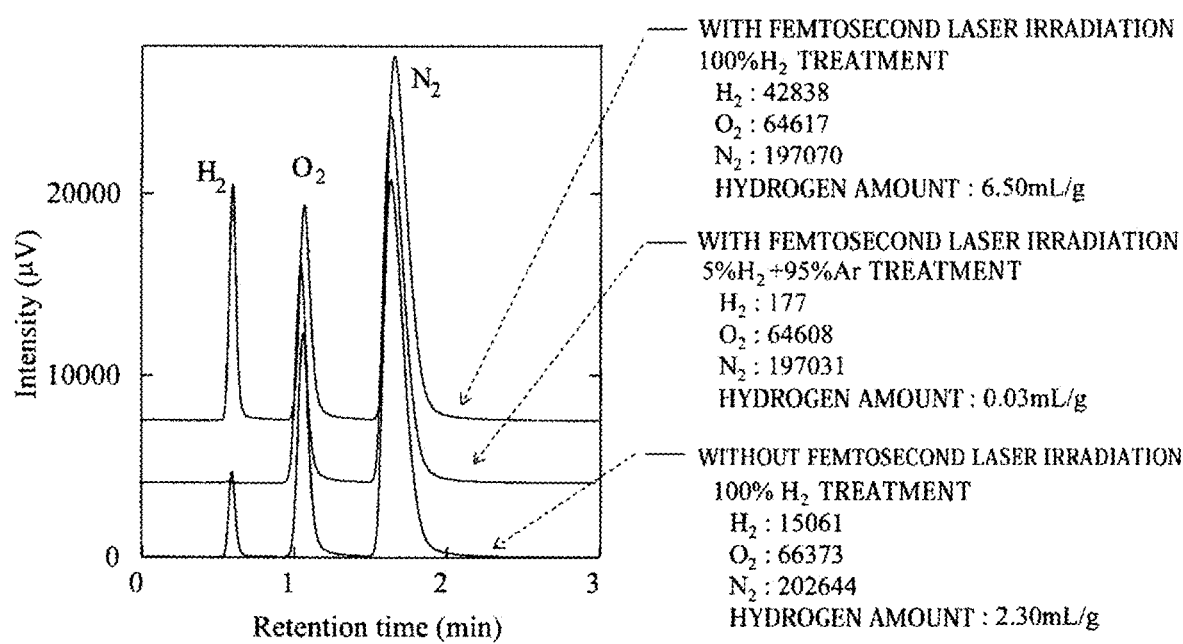
FIG. 7 is a graph showing a relationship between time and the total hydrogen amount.

From these images, it is found that by the femtosecond laser irradiation, the particle diameter is decreased, and the specific surface area is increased.
(4) Evaluation of Hydrogen Occlusion Property 100% Hydrogen was contacted with the femtosecond laser-irradiated mayenite type compound (specific surface area: 8.14 m$^2$/g) obtained in Example 3 under the conditions of normal pressure and 1250° C. over 2 hours, and thereafter, the compound was left to cool to room temperature, whereby a hydrogen occlusion material composed of the laser-irradiated mayenite type compound was obtained. Subsequently, as shown in FIG. 6, this hydrogen occlusion material (0.045 g) and water (1 mL) were placed in a reactor (5) having a volume of 5 mL and equipped with a heater, and the hydrogen occlusion material was heated to 60° C. by the heater, and the generated gas was passed through a dehumidifier (6) filled with silica gel as a dehumidifying material and sent to a gas chromatograph (7), and thereby the hydrogen generation amount was measured. Peaks detected by the gas chromatograph are shown in FIG. 7. The hydrogen generation amount was 6.5 mL/g. Further, in the case of using 5% hydrogen (95% argon) in the above experiment, the hydrogen generation amount was 0.03 mL/g.

In comparison, the same procedure as above was performed except that the same amount of the femtosecond laser-unirradiated mayenite type compound (specific surface area: 1.35 m$^2$/g) of Comparative Example 1 was used in place of the laser-irradiated mayenite type compound of Example 3, and the hydrogen generation amount was measured. The hydrogen generation amount was 2.3 mL/g.

Further, in the case of using 5% hydrogen (95% argon) in the above experiment, the hydrogen generation amount was equal to or less than the detection limit of the gas chromatograph.

The invention claimed is:

1. A surface modified calcium aluminate compound having at least one of an OH group, a CO group, a CH group, or an NH group, wherein the surface modified calcium aluminate compound is produced by irradiating a calcium aluminate compound dispersed in a dispersion medium with a femtosecond laser, thereby modifying the surface of the calcium aluminate compound.

2. The surface modified calcium aluminate compound according to claim 1 having an average particle diameter of 7 μm or less.

3. The surface modified calcium aluminate compound according to claim 2 having a median diameter (D50) of 60 µm or less.

4. A method for producing a surface modified calcium aluminate compound according to claim 2, comprising irradiating a calcium aluminate compound dispersed in a dispersion medium with a femtosecond laser, thereby modifying the surface of the calcium aluminate compound.

5. The method for producing a surface modified calcium aluminate compound according to claim 4, comprising irradiating a calcium aluminate compound in a particulate form dispersed in an alcohol with a femtosecond laser, thereby atomizing the calcium aluminate compound in a particulate form.

6. The method for producing a surface modified calcium aluminate compound according to claim 4, characterized by characterized by dispersing a calcium aluminate compound in a particulate form in alcohols having different polarities and irradiating the compound with a femtosecond laser, thereby controlling the particle diameter of the calcium aluminate compound in a particulate form.

7. The surface modified calcium aluminate compound according to claim 1 having a median diameter (D50) of 60 µm or less.

8. A method for producing a surface modified calcium aluminate compound according to claim 7, comprising irradiating a calcium aluminate compound dispersed in a dispersion medium with a femtosecond laser, thereby modifying the surface of the calcium aluminate compound.

9. The method for producing a surface modified calcium aluminate compound according to claim 8, irradiating a calcium aluminate compound in a particulate form dispersed in an alcohol with a femtosecond laser, thereby atomizing the calcium aluminate compound in a particulate form.

10. The method for producing a surface modified calcium aluminate compound according to claim 8, characterized by characterized by dispersing a calcium aluminate compound in a particulate form in alcohols having different polarities and irradiating the compound with a femtosecond laser, thereby controlling the particle diameter of the calcium aluminate compound in a particulate form.

11. A method for producing a surface modified calcium aluminate compound, comprising irradiating a calcium aluminate compound dispersed in a dispersion medium with a femtosecond laser to produce a surface modified calcium aluminate compound having at least one of an OH group, a CO group, a CH group, or an NH group.

12. The method for producing a surface modified calcium aluminate compound according to claim 11, wherein the dispersion medium is an alcohol, an ether, a saccharide, a hydrocarbon, a nitrogen-containing organic compound, a halogen-containing organic compound, a boron-containing organic compound, or a sulfur-containing organic compound.

13. The method for producing a surface modified calcium aluminate compound according to claim 12, wherein the pulse width of the femtosecond laser is $10^{-15}$ s or more and $10^{-12}$ s or less.

14. The method for producing a surface modified calcium aluminate compound according to claim 12, characterized in that the calcium aluminate compound is a compound having a composition of mayenite ($Ca_{12}Al_{14}O_{33}$) and having a crystalline structure constituted by three-dimensionally connected voids or katoite [$Ca_3A_{12}(OH)_{12}$].

15. The method for producing a surface modified calcium aluminate compound according to claim 11, comprising irradiating a calcium aluminate compound in a particulate form dispersed in an alcohol with a femtosecond laser, thereby atomizing the calcium aluminate compound in a particulate form.

16. The method for producing a surface modified calcium aluminate compound according to claim 15, wherein the pulse width of the femtosecond laser is $10^{-15}$ s or more and $10^{-12}$ s or less.

17. The method for producing a surface modified calcium aluminate compound according to claim 15, characterized in that the calcium aluminate compound is a compound having a composition of mayenite ($Ca_{12}Al_{14}O_{33}$) and having a crystalline structure constituted by three-dimensionally connected voids or katoite [$Ca_3Al_2(OH)_{12}$].

18. The method for producing a surface modified calcium aluminate compound according to claim 11, comprising dispersing a calcium aluminate compound in a particulate form in alcohols having different polarities and irradiating the compound with a femtosecond laser, thereby controlling the particle diameter of the calcium aluminate compound in a particulate form.

19. The method for producing a surface modified calcium aluminate compound according to claim 11, wherein the pulse width of the femtosecond laser is $10^{-15}$ s or more and $10^{-12}$ s or less.

20. The method for producing a surface modified calcium aluminate compound according to claim 11, wherein the calcium aluminate compound is a compound having a composition of mayenite ($Ca_{12}Al_{14}O_{33}$) and having a crystalline structure constituted by three-dimensionally connected voids or katoite [$Ca_3Al_2(OH)_{12}$].

\* \* \* \* \*